Oct. 22, 1968    P. B. JEANNIN    3,406,693
TOBACCO PIPES
Filed Oct. 22, 1965

INVENTOR
PAUL BENOIT JEANNIN
BY Edward G. Roe
ATTORNEY

United States Patent Office 3,406,693
Patented Oct. 22, 1968

3,406,693
TOBACCO PIPES
Paul Benoit Jeannin, London, England, assignor to Sasieni Limited, London, England, a British company
Filed Oct. 22, 1965, Ser. No. 501,519
Claims priority, application Great Britain, Dec. 15, 1964, 51,064/64
3 Claims. (Cl. 131—195)

ABSTRACT OF THE DISCLOSURE

A tobacco pipe having a bowl detachably mounted in a cupped bowl support, and a collar-stud-shaped insert having an apertured disc portion which is received in an opening in the base of the bowl and a stem portion which extends vertically downwards from the disc portion and presses on an absorbent pad in the bottom of the bowl support.

---

This invention relates to tobacco pipes.

According to the present invention there is provided a tobacco pipe comprising a bowl detachably engaged with a cupped bowl support, and a stem extending from said bowl support, the bowl having an opening in the base thereof forming a passage through which smoke can be drawn from the bowl into the bowl support, and retaining means disposed below the base of the bowl for holding an absorbent pad in position in said bowl support.

Preferably said retaining means is in the form of an insert which is disposed between, but is detachable from, said bowl and said bowl support.

Further according to the present invention there is provided a tobacco pipe comprising a bowl detachably engaged with a cupped bowl support, and a stem extending from said bowl support, the bowl having an opening in the base thereof forming a passage through which smoke can be drawn from the bowl into the bowl support, and an insert disposed between, but detachable from, said bowl and said bowl support, and extending at least partially across said opening, said insert being shaped to provide one or more paths for smoke flowing from said opening into the bowl support and arranged to hold an absorbent pad in position on the bottom of the bowl support.

Figure 1:
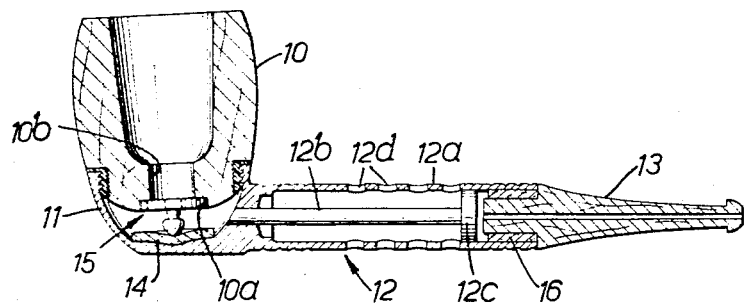
Figure 2:
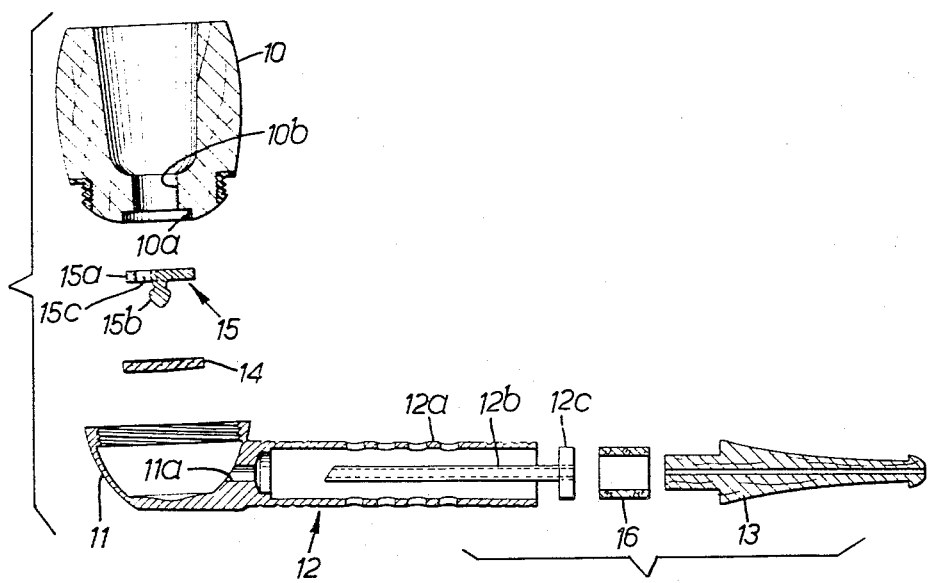

These and other features of the invention will now be particularly described with reference to the accompanying drawings in which:

FIGURE 1 is a central longitudinal sectional view through a tobacco pipe in accordance with the invention, and FIGURE 2 is an exploded view of the pipe of FIGURE 1.

The tobacco pipe shown in the drawings comprises a detachable bowl 10, a cup-shaped bowl support 11, and a stem 12 to which a mouthpiece 13 is fitted at its end remote from the bowl.

The bowl, which is made of briar or other suitable material is screwed into the upper rim of the cup-shaped bowl support. Preferably a plastic washer is interposed between the bowl and bowl support, the washer being in the form of a flanged tube having an internal screwthread engaging a screwthread on the bowl and an external quick screwthread engaging a corresponding screwthread within the rim of the bowl support. The base of the bowl which fits within the bowl support is domeshaped and is formed with a central recess 10a and a central opening 10b through which smoke can be drawn from the inside of the bowl into the bowl support.

On the base of the cup-shaped bowl support is an absorbent pad 14 for absorbing liquid (e.g. saliva or condensate) which tends to accumulate in the bowl support. In order to retain this pad in position on the bottom of the bowl support and prevent it from moving into a position in which it might obstruct the flow of smoke into the bowl support and from the bowl support into the stem, an insert 15 is provided in the form of a disc 15a which is received and located in the recess 10a of the bowl and has a central dependent projection 15b including at its lower end a ball-shaped foot which rests on the pad. The disc is formed with a number of apertures 15c, in particular three, which are located below the opening 10b in the base of the bowl which provide paths for the flow of smoke from the opening 10b of the bowl intot the bowl support. By means of the projection 15b, the disc is held in spaced relationship to the pad and the bottom of the bowl support.

It will be evident that the insert serves not only to hold the pad in position, but also as a grate for preventing tobacco or ash from falling through the opening 10b in the base of the bowl into the bowl support.

The stem of the pipe comprises an outer tubular wall 12a which extends away from the bowl support, and and inner tubular wall 12b which, at one end, fits into an opening 11a in the bowl support and at its opposite end is formed with a flange 12c for supporting and spacing the inner wall with respect to the outer wall. The inner tubular wall thus provides a path for smoke from the bowl support to the mouthpiece.

The outer wall 12a, at its end remote from the bowl, serves to receive the reduced end of the mouthpiece 13. Preferably a sleeve-shaped washer 16, conveniently of cork, is fitted between the reduced end of the mouthpiece and the end of the outer tubular wall. The outer tubular wall is also formed with apertures 12d to permit atmospheric air to flow around the inner wall for cooling purposes.

The bowl support 11 is preferably formed integrally with the outer tubular wall 12a of the stem in metal, the inner tubular wall and its flange also being made of metal. The insert 15 for retaining the absorbent pad in position is also preferably made of metal.

As shown in FIGURE 2, the bowl is readily removed from the bowl support and likewise the insert can be removed to permit replacement of the pad and cleaning of the bowl support.

I claim:
1. A tobacco pipe comprising in combination
   a cupped bowl support having a horizontally extending bottom wall and an open upper end
   a bowl detachably engaged with the upper end of said cupped bowl support and
   a stem integral with said bowl support and extending laterally therefrom, the bowl having a central vertical bore extending through the base thereof,
   said bowl base having a lower surface spaced upwardly from the bottom of said support and having a downwardly opening annular recess therein surrounding the lower end of said vertical bore, and
   an insert having a flat disc portion detchably received in said annular recess on the underside of the base of the bowl, the disc portion having apertures therein through which smoke passing downwardly through the bore can flow into the bowl support,
   said insert having a downwardly-extending portion, and
   an absorbent pad resting on the floor of the bowl support, characterised in that
said insert is substantially of collar-stud shape, the downwardly-extending portion being formed as a stem integral with the disc portion at the centre thereof and extending vertically downwardly therefrom with its lower end resting on the absorbent pad on the floor of the bowl support and retaining the absorbent pad in position in the bowl support, the apertures in the disc portion being located closely around the junction of said stem portion with said disc portion.

2. A tobacco pipe according to claim 1 wherein the stem comprises an outer tubular wall to which a mouthpiece is attached at its end remote from the bowl, and an inner tubular wall through which smoke can pass from the bowl support to the mouthpiece.

3. A tobacco pipe according to claim 2 wherein said outer wall is perforated to permit air to flow around the inner wall for cooling purposes.

References Cited

UNITED STATES PATENTS

| | | | |
|---|---|---|---|
| 796,613 | 8/1905 | Stone | 131—203 X |
| 1,510,003 | 9/1924 | Johnson | 131—207 X |
| 1,593,486 | 7/1926 | Dodson | 131—203 |
| 1,628,649 | 5/1927 | Bittner | 131—203 |
| 1,943,907 | 1/1934 | Watry | 131—203 |
| 1,996,119 | 4/1935 | O'Neal | 131—207 |
| 2,572,048 | 10/1951 | Nisbet | 131—203 |
| 3,221,752 | 12/1965 | Strahm | 131—207 X |
| 1,874,075 | 8/1932 | Whelen | 131—205 |

FOREIGN PATENTS

| | | |
|---|---|---|
| 367,882 | 9/1906 | France. |
| 5,646 | 3/1884 | Great Britain. |
| 158,435 | 2/1921 | Great Britain. |
| 456,441 | of 1936 | Great Britain. |

JOSEPH S. REICH, *Primary Examiner.*